(12) United States Patent
Yang et al.

(10) Patent No.: US 9,495,053 B2
(45) Date of Patent: Nov. 15, 2016

(54) TOUCH SCREEN PANEL AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Shengji Yang, Beijing (CN); Xue Dong, Beijing (CN); Haisheng Wang, Beijing (CN); Yingming Liu, Beijing (CN); Xiaoliang Ding, Beijing (CN); Weijie Zhao, Beijing (CN); Hongjuan Liu, Beijing (CN); Changfeng Li, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 14 days.

(21) Appl. No.: 14/654,126

(22) PCT Filed: Jan. 13, 2015

(86) PCT No.: PCT/CN2015/070615
§ 371 (c)(1),
(2) Date: Jun. 19, 2015

(87) PCT Pub. No.: WO2016/041308
PCT Pub. Date: Mar. 24, 2016

(65) Prior Publication Data
US 2016/0259444 A1    Sep. 8, 2016

(30) Foreign Application Priority Data

Sep. 16, 2014 (CN) .......................... 2014 1 0473256

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ..... G06F 3/044; G06F 3/0412; G06F 3/0416
USPC ....................................................... 345/174
See application file for complete search history.

(56) References Cited

U.S. PATENT DOCUMENTS

2015/0338989 A1* 11/2015 Noto ...................... G06F 3/0416
345/174
2015/0355510 A1* 12/2015 Kurasawa ............. G06F 3/0412
349/12

(Continued)

*Primary Examiner* — Fred Tzeng
(74) *Attorney, Agent, or Firm* — Nath, Goldberg & Meyer; Joshua B. Goldberg (57) ABSTRACT

The present invention discloses a touch screen panel and a display device, the touch screen panel comprises an array substrate and an assembling substrate which are arranged opposite to each other, and a touch detection chip for detecting a touch, wherein the array substrate comprises: a first predetermined number of first self capacitive electrodes and first leads; the assembling substrate comprises: a second predetermined number of second self capacitive electrodes and second leads; projections of the first self capacitive electrodes on the assembling substrate fall within a region on the assembling substrate without the second self capacitive electrodes. In solutions of the present invention, width of the frame region of the array substrate or the assembling substrate can be reduced accordingly, and narrow frame of the touch screen panel can be realized.

13 Claims, 6 Drawing Sheets

(56) References Cited

U.S. PATENT DOCUMENTS

| | | | | |
|---|---|---|---|---|
| 2015/0355751 A1* | 12/2015 | Kurasawa | ............... | G06F 3/044 345/174 |
| 2015/0355752 A1* | 12/2015 | Kurasawa | ............... | G06F 3/044 345/174 |
| 2016/0048233 A1* | 2/2016 | Wang | .................... | G06F 3/0412 345/174 |
| 2016/0098113 A1* | 4/2016 | Ding | .................... | G02F 1/1333 345/174 |
| 2016/0188031 A1* | 6/2016 | Wang | ..................... | G06F 3/044 345/174 |

* cited by examiner

TOUCH SCREEN PANEL AND DISPLAY DEVICE

This is a National Phase Application filed under 35 U.S.C. 371 as a national stage of PCT/CN2015/070615, filed Jan. 13, 2015, and claims priority benefit from Chinese Application No. 201410473256.4, filed Sep. 16, 2014, the content of each of which is hereby incorporated by reference in its entirety.

FIELD OF THE INVENTION

The invention relates to the field of display technology, and particularly to a touch screen panel and a display device.

BACKGROUND OF THE INVENTION

With rapid development of the display technology, touch screen panel has been popular in people's lives. At present, an existing in-cell touch screen panel detects finger's touch position by adopting a mutual capacitive or self capacitive principle. Compared to the mutual capacitive touch screen panel, the self capacitive touch screen panel has a high signal noise ratio and low cost in necessary devices.

Figure 1:
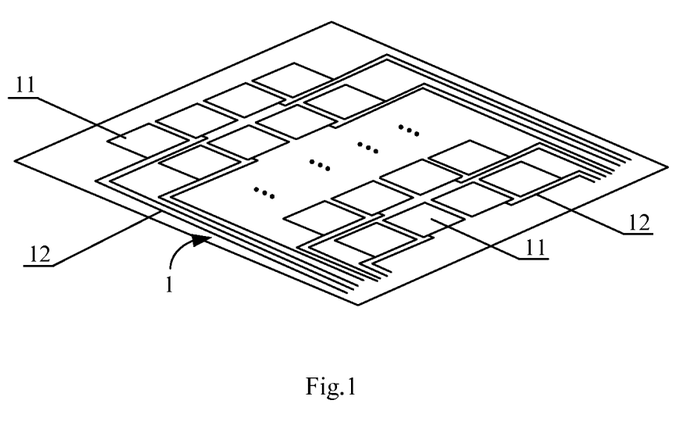
FIG. 1 is a diagram of a self capacitive touch screen panel, in which a self capacitive electrode is provided in an array substrate, in the prior art.

The self capacitive touch screen panel in the prior art will be described in detail below in conjunction with drawings. FIG. 1 is a diagram of a self capacitive touch screen panel, in which a self capacitive electrode is provided in an array substrate, in the prior art, as shown in FIG. 1, a plurality of self capacitive electrodes, which are provided in the same layer and insulated from each other, are provided on the array substrate, each self capacitive electrode is connected to a touch detection chip through a separated lead. The lead includes a surrounding wire provided in a border region of the array substrate and a wire, one end of which is connected to the self capacitive electrode and the other end of which is connected to the surrounding wire. Certainly, in the prior art, all the self capacitive electrodes may also be provided in the assembling substrate.

A working principle of the self capacitive touch screen panel is as follows: when a human body does not touch the screen panel, each self capacitive electrode bears a capacitance of a fixed value, and when the human body touches the screen panel, the corresponding self capacitive electrode bears the capacitance of the fixed value plus a body capacitance, then a touch position may be determined by the touch detection chip through detecting variations in capacitance values of the respective self capacitive electrodes during the touch period.

However, since the number of the self capacitive electrodes is large, the number of corresponding leads is large, taking the case that each self capacitive electrode occupies an area of 5 mm*5 mm as an example, a 5 inch liquid crystal display panel needs more than 260 self capacitive electrodes, the large number of self capacitive electrodes result in increase of wires in a channel in the touch screen panel, and thus a touch blind zone (which refers to a region in which wires are crowded, and signals in the region are relatively chaotic, thus touch performance cannot be ensured) is caused. In addition, during designing, in order to reduce the number of films, wires in the leads are generally provided in the same layer as the self capacitive electrodes, each self capacitive electrode needs a separated wire to lead it to the frame region, and surrounding wires in one-to-one correspondence with the wires are provided in the frame region. Since the number of the self capacitive electrodes is large, thus the number of corresponding surrounding wires on the array substrate or the assembling substrate is large, which may cause the frame region of the touch screen panel to be broader, and is adverse to the narrow frame design.

SUMMARY OF THE INVENTION

The present invention provides a touch screen panel and a display device, which are used to solve the problem of large frame region of the touch screen panel due to too many wires at the periphery of the frame region in the prior art.

To realize the above object, the present invention provides a touch screen panel, comprising: an array substrate, an assembling substrate arranged opposite to the array substrate, and a touch detection chip for detecting a touch, wherein the array substrate comprises: a first predetermined number of first self capacitive electrodes and first leads in one-to-one correspondence with the first self capacitive electrodes, the first leads are used for transmitting feedback signals generated by the first self capacitive electrodes to the touch detection chip;

the assembling substrate comprises: a second predetermined number of second self capacitive electrodes and second leads in one-to-one correspondence with the second self capacitive electrodes, the second leads are used for transmitting feedback signals generated by the second self capacitive electrodes to the touch detection chip; and projections of the first self capacitive electrodes on the assembling substrate fall within a region on the assembling substrate without the second self capacitive electrodes.

Optionally, the first self capacitive electrodes are located in an upper half part of the array substrate, and the second self capacitive electrodes are located in a lower half part of the assembling substrate; or the first self capacitive electrodes are located in a lower half part of the array substrate, and the second self capacitive electrodes are located in an upper half part of the assembling substrate.

Optionally, the first self capacitive electrodes are located in a middle region of the array substrate, and the second self capacitive electrodes are located in a surrounding region of the assembling substrate;

or the first self capacitive electrodes are located in a surrounding region of the array substrate, and the second self capacitive electrodes are located in a middle region of the assembling substrate.

Optionally, the first predetermined number is equal to the second predetermined number.

Optionally, the array substrate further comprises several common electrodes and a common voltage drive unit, the common electrodes are provided in the same layer as the first self capacitive electrodes, all the common electrodes are connected to the common voltage drive unit through one third lead, and all the first leads are further connected to the common voltage drive unit;

the common voltage drive unit is used to output a common voltage signal to the first self capacitive electrodes and the common electrodes during a display period, and output the common voltage signal to the common electrodes during a touch period.

Optionally, the first self capacitive electrode is plate-shaped.

Optionally, the first leads are provided in a different layer from the first self capacitive electrodes, each of the first self capacitive electrodes is electrically connected to one corresponding first lead through a via; and the second leads are provided in the same layer as the second self capacitive electrodes, or the second leads are provided in a different layer from the second self capacitive electrodes, each of the second self capacitive electrodes is electrically connected to one corresponding second lead through a via; and the first leads are provided in the same layer as the first self capacitive electrodes.

Optionally, the second self capacitive electrode is a mesh-shaped electrode, meshes of which correspond to display regions of pixel units in the touch screen panel. Optionally, the assembling substrate further comprises: dummy electrodes provided in the same layer as the second self capacitive electrodes, all the dummy electrodes are connected together through a fourth lead, and the fourth lead is used to allow the dummy electrodes to be in a float state.

To realize the above object, the present invention further provides a display device comprising the above touch screen panel.

The present invention has following advantages:

The present invention provides a touch screen panel and a display device, the touch screen panel comprises an array substrate, an assembling substrate arranged opposite to the array substrate, and a touch detection chip for detecting a touch, wherein the array substrate comprises: a first predetermined number of first self capacitive electrodes and first leads in one-to-one correspondence with the first self capacitive electrodes, the first leads are used for transmitting feedback signals generated by the first self capacitive electrodes to the touch detection chip; the assembling substrate comprises: a second predetermined number of second self capacitive electrodes and second leads in one-to-one correspondence with the second self capacitive electrodes, the second leads are used for transmitting feedback signals generated by the second self capacitive electrodes to the touch detection chip; and projections of the first self capacitive electrodes on the assembling substrate fall within a region on the assembling substrate without the second self capacitive electrodes. In the solution of the present invention, the first self capacitive electrodes are provided in the array substrate, the second self capacitive electrodes are provided in the assembling substrate, and projections of the first self capacitive electrodes on the assembling substrate fall within a region on the assembling substrate without the second self capacitive electrodes, thus the number of leads which should be provided in the array substrate or the assembling substrate is reduced while normal touch function of the touch screen panel can be ensured, therefore, width of the frame region of the array substrate or the assembling substrate can be reduced accordingly, and narrow frame of the touch screen panel can be realized.

DETAILED DESCRIPTION OF THE EMBODIMENTS

To make a person skilled in the art better understand the solutions of the present invention, the touch screen panel and the display device of the present invention will be described in detail below in conjunction with the drawings.

First Embodiment

Figure 2:
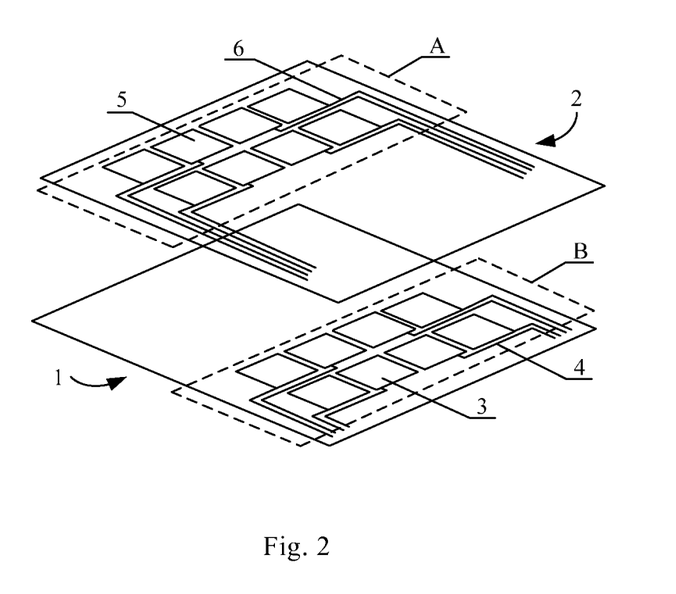
FIG. 2 is a structural diagram of a touch screen panel in a first embodiment of the present invention.
Figure 3:
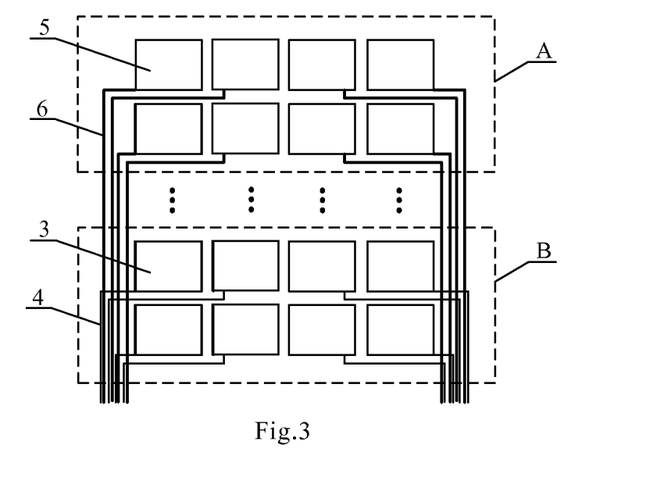
FIG. 3 is a top view of the touch screen panel in FIG. 2.

FIG. 2 is a structural diagram of a touch screen panel in a first embodiment of the present invention, and FIG. 3 is a top view of the touch screen panel in FIG. 2, as shown in FIG. 2 and FIG. 3, the touch screen panel comprises an array substrate 1 and an assembling substrate 2, wherein the array substrate 1 and the assembling substrate 2 are provided opposite to each other, the array substrate 1 comprises: a first predetermined number of first self capacitive electrodes 3 and first leads 4 in one-to-one correspondence with the first self capacitive electrodes 3, the assembling substrate comprises: a second predetermined number of second self capacitive electrodes 5 and second leads 6 in one-to-one correspondence with to the second self capacitive electrodes 5. The first leads 4 are used for transmitting feedback signals generated by the first self capacitive electrodes 3 to a touch detection chip (not shown), the second leads 6 are used for transmitting feedback signals generated by the second self capacitive electrodes 5 to the touch detection chip; projections of the first self capacitive electrodes 3 on the assembling substrate 2 fall within a region on the assembling substrate 2 without the second self capacitive electrodes 5. In the embodiment, the first leads are provided in the same layer as the first self capacitive electrodes, and the second leads are provided in the same layer as the second self capacitive electrodes.

It should be noted that, all electrodes in the region A of the assembling substrate 2 in FIG. 2 are the second self capacitive electrodes, all electrodes in the region B of the array substrate 1 in FIG. 2 are the first self capacitive electrodes 3, but positions at which the second self capacitive electrodes 5 are provided on the assembling substrate 2 are not limited to be only in the region A, and positions at which the first self capacitive electrodes 3 are provided on the array substrate 1 are not limited to be only in the region B, as long as projections of the first self capacitive electrodes 3 on the assembling substrate 2 fall within a region on the assembling substrate 2 without the second self capacitive electrodes 5.

Compared to the prior art, in the solution of the present invention, the self capacitive electrodes are classified into the first self capacitive electrodes 3 and the second self capacitive electrodes 5, wherein the first self capacitive electrodes 3 are provided on the array substrate 1, the second self capacitive electrodes 5 are provided on the assembling substrate 2, and projections of the first self capacitive electrodes 3 on the assembling substrate 2 fall within a region on the assembling substrate 2 without the second self capacitive electrodes 5, thus the number of leads which should be provided on the array substrate 1 or the assembling substrate 2 is reduced while normal touch function of the touch screen panel can be ensured, therefore, width of the frame region of the array substrate 1 or the assembling substrate 2 can be reduced accordingly, and narrow frame of the touch screen panel can be realized.

With reference to FIG. 2 and FIG. 3, as a specific embodiment of the present invention, the first self capacitive electrodes 3 are located in a lower half part of the array substrate 1, and the second self capacitive electrodes 5 are located in an upper half part of the assembling substrate 2. Certainly, a case in which the first self capacitive electrodes are located in an upper half part of the array substrate and the second self capacitive electrodes are located in a lower half part of the assembling substrate is also possible, which is not shown in the drawings.

It should be noted that, in FIG. 2, projections of portions of the second leads 6 in the frame region of the touch screen panel on the array substrate 1 may partially overlap with the first leads 4 of the array substrate 1.

As a preferable solution, the first predetermined number is equal to the second predetermined number, that is, the number of the first leads 4 on the array substrate 1 is equal to the number of the second leads 6 on the assembling substrate 2. In this embodiment, it is assumed that a sum of the number of the first leads 4 and the number of the second leads 6 is a, if the number of the first leads 4 is not equal to the number of the second leads 6, then one of the number of the first leads 4 and the number of the second leads 6 is at least larger than a/2, and more than a/2 leads are correspondingly to be provided in the frame region of the array substrate 1 or the assembling substrate 2, thus the width of the frame region of the entire touch screen panel is required to be larger than a total width of the more than a/2 leads. If the number of the first leads 4 is equal to the number of the second leads 6, then a/2 leads are to be provided in the frame region of each of the array substrate 1 and the assembling substrate 2, thus the width of the frame region of the entire touch screen panel is only required to be equal to a total width of the a/2 leads. Therefore, when the first predetermined number is equal to the second predetermined number, the width of the frame region of the touch screen panel can be effectively reduced.

Certainly, the arrangements of the first self capacitive electrodes 3 and the second self capacitive electrodes 5 are not limited thereto, the arrangements of the first self capacitive electrodes 3 and the second self capacitive electrodes 5 may be adjusted according to actual needs. For example, the first self capacitive electrodes are located in a middle region of the array substrate, and the second self capacitive electrodes are located in a surrounding region of the assembling substrate; alternatively, the first self capacitive electrodes are located in a surrounding region of the array substrate, and the second self capacitive electrodes are located in a middle region of the assembling substrate (no corresponding drawing is provided for this embodiment). Other arrangements applicable to this embodiment will not be recited herein.

It should be noted that, the case in which each row of electrodes include four electrodes in the drawing of this embodiment is just exemplified, and is not used to limit the solutions of this application.

The present embodiment provides a touch screen panel, in which the first self capacitive electrodes are provided in the array substrate, the second self capacitive electrodes are provided in the assembling substrate, and projections of the first self capacitive electrodes on the assembling substrate fall within a region on the assembling substrate without the second self capacitive electrodes, thus compared to solution in which all the leads are provided on the array substrate or the assembling substrate in the prior art, the number of leads which should be provided in the array substrate or the assembling substrate is reduced while normal touch function of the touch screen panel can be ensured, therefore, width of the frame region of the array substrate or the assembling substrate can be reduced accordingly, and narrow frame of the touch screen panel can be realized.

Second Embodiment

Figure 4:
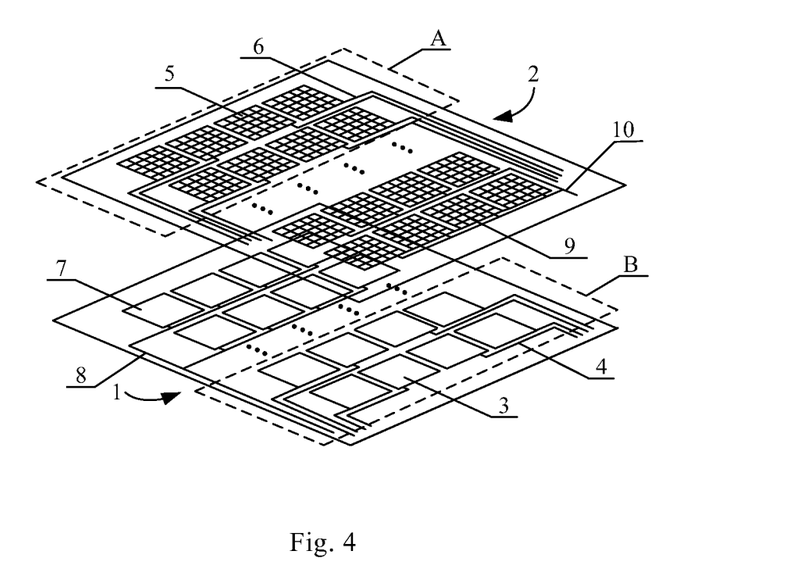
FIG. 4 is a structural diagram of a touch screen panel in a second embodiment of the present invention.
Figure 5:
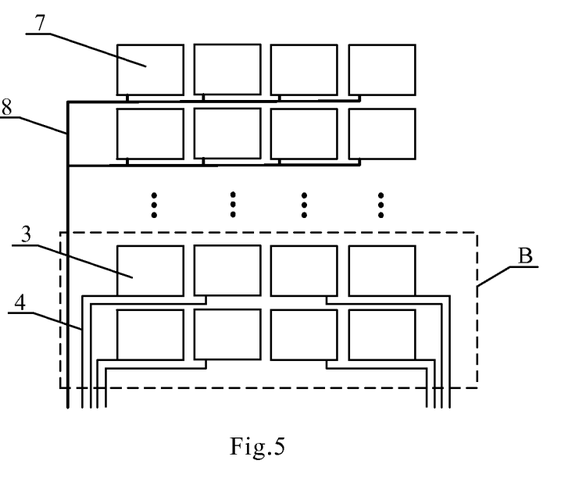
FIG. 5 is a top view of the array substrate in FIG. 4.
Figure 6:
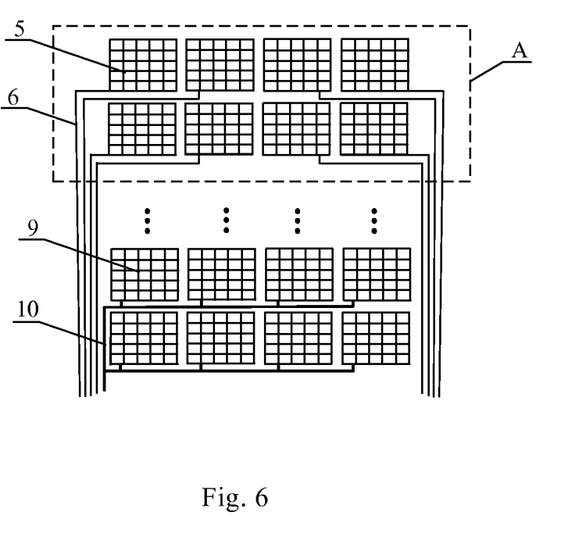
FIG. 6 is a top view of the assembling substrate in FIG. 4.

FIG. 4 is a structural diagram of a touch screen panel in a second embodiment of the present invention, FIG. 5 is a top view of the array substrate of the touch screen panel in FIG. 4, and FIG. 6 is a top view of the assembling substrate of the touch screen panel in FIG. 4, as shown FIG. 4 to FIG. 6, the first self capacitive electrodes 3 are located in a lower half part of the array substrate 1 (including the region B), and the second self capacitive electrodes 5 are located in an upper half part of the assembling substrate 2 (including the region A). Difference between this embodiment and the above first embodiment is in that, the array substrate 1 in this embodiment further comprises several common electrodes 7, the common electrodes 7 are provided in the same layer as the first self capacitive electrodes 3 and are provided in the upper half part of the array substrate 1, all the common electrodes 7 are connected to a common voltage drive unit (not shown) through one third lead 8, and all the first leads 4 are further connected to the common voltage drive unit. The common voltage drive unit is used to output a common voltage signal to the first self capacitive electrodes 3 and the common electrodes 7 during a display period, and output the common voltage signal to the common electrodes 7 during a touch period. In this embodiment, the first self capacitive electrodes 3 and the common electrodes 7 are plate-shaped.

It should be noted that, in this embodiment, the first leads 4 are provided in the same layer as the first self capacitive electrodes 3, and the second leads 6 are provided in the same layer as the second self capacitive electrodes 5.

In this embodiment, the first self capacitive electrodes 3 can be multiplexed as common electrodes during the display period, structure of the array substrate therefore can be effectively simplified. In addition, the first self capacitive electrodes 3 and the common electrodes 7 may be formed through a single patterning process, thus production cycle of the array substrate can be effectively shortened.

It is found that, in actual production, as the second self capacitive electrodes 5 may absorb a part of transmitted light, light transmissivity of region of the assembling substrate 2 covered with the second self capacitive electrodes 5 is smaller than that of region the assembling substrate 2 not covered with the second self capacitive electrodes 5, thus the assembling substrate 2 transmits light nonuniformly and in turn display effect of the touch screen panel is decreased. In order to solve the above problem, in this embodiment, the assembling substrate is further provided thereon with several dummy electrodes 9 arranged in the same layer as the second self capacitive electrodes 5, these dummy electrodes 9 may also absorb part of the transmitted light, so that the assembling substrate 2 can transmit light uniformly. In order to avoid interference of the dummy electrodes on the second self capacitive electrodes 5, all the dummy electrodes 9 are connected together through one fourth lead 10, the fourth lead 10 is used to allow the dummy electrodes 9 to be always in a float state or grounded. In FIG. 4, the dummy electrodes 9 are located in the lower half part of the assembling substrate 2.

Figure 7:
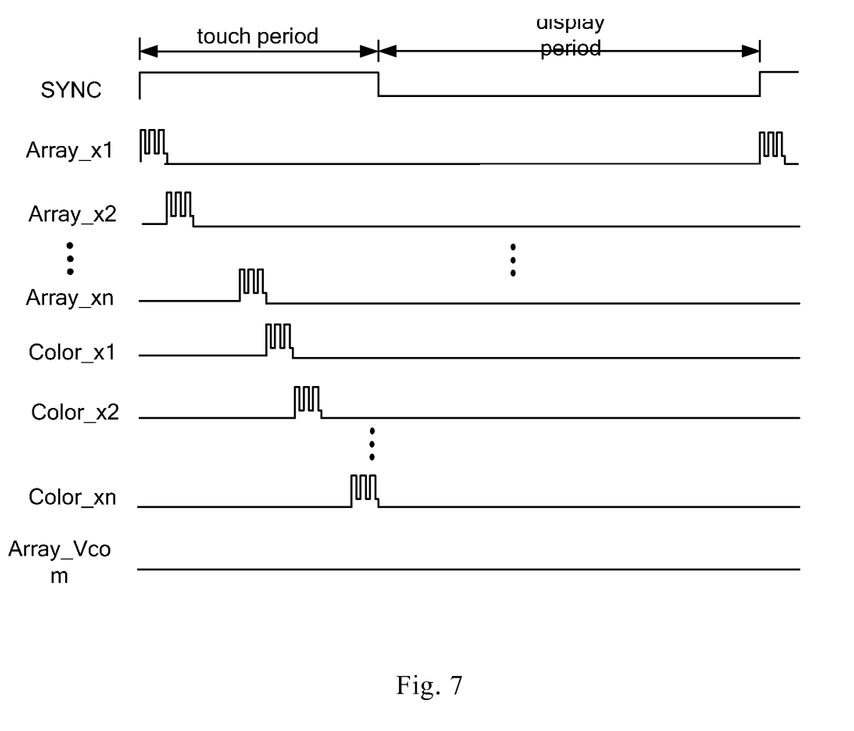
FIG. 7 is an operation timing diagram of the touch screen panel in the second embodiment.

Operation procedure of the touch screen panel of this embodiment will be explained in detail below in conjunction with drawings. FIG. 7 is an operation timing diagram of the touch screen panel in the second embodiment, and as shown in FIG. 7, the operation procedure of the touch screen panel includes two periods: a touch period and a display period.

During the touch period, a synchronization signal SYNC is at a high level, the common electrode Array_Vcom is applied with a common voltage signal, the touch detection chip outputs a touch scan signal to the fist self capacitive electrodes Array_x1, Array_x2 . . . Array_xn on the array substrate 1 one by one according to a predetermined output scheme, till all the fist self capacitive electrodes Array_x1, Array_x2 . . . Array_xn on the array substrate 1 have been applied with the touch scan signal. Next, the touch detection chip outputs a touch scan signal to the second self capacitive electrodes color_x1, color_x2 . . . color_xn on the assembling substrate 2 one by one according to a predetermined output scheme, till all the second self capacitive electrodes color_x1, color_x2 . . . color_xn on the assembling substrate 2 have been applied with the touch scan signal. At this time, the touch period is completed.

During the above touch period, when a human body does not touch the screen panel, each self capacitive electrode bears a capacitance of a fixed value, and at this time, there is no change in the feedback signals of the respective self capacitive electrodes. When the human body touches the screen panel, corresponding self capacitive electrode bears the capacitance of the fixed value plus a body capacitance, at this time, feedback signals of the respective self capacitive electrodes vary, then a touch position may be determined by the touch detection chip through detecting variations in capacitance values of the respective self capacitive electrodes during the touch period.

It should be noted that, during the touch period, the touch detection chip may first output a touch scan signal to the second self capacitive electrodes color_x1, color_x2 . . . color_xn on the assembling substrate 2, and then output a touch scan signal to the fist self capacitive electrodes Array_x1, Array_x2 . . . Array_xn on the array substrate 1.

During the display period, the synchronization signal SYNC is at a low level, the common electrode Array_Vcom is continuously applied with a common voltage signal, the touch detection chip applies a common voltage signal to the fist self capacitive electrodes Array_x1, Array_x2 . . . Array_xn on the array substrate 1, and at this time, the second self capacitive electrodes color_x1, color_x2 . . . color_xn on the assembling substrate 2 are in a float state. At this time, the display period is completed.

With reference to FIG. 4 and FIG. 6 again, in actual production, since the second self capacitive electrode is large in size, and one second self capacitive electrode 5 always covers a plurality of pixel units, the second self capacitive electrode 5 inevitably affects the light transmissivity of part of pixel units in the touch screen panel. In this embodiment, preferably, the second self capacitive electrode 5 is a mesh-shaped electrode, meshes of which correspond to display regions of pixel units in the touch screen panel, so that the influence of the second self capacitive electrode 5 on light transmissivity of the pixel units. Accordingly, the dummy electrode is also mesh-shaped.

The second embodiment of the present invention provides a touch screen panel, which can not only bring about the technical effect recited in the above first embodiment, but also simplifies the structure of the array substrate by multiplexing the first self capacitive electrodes. In addition, the first self capacitive electrodes and the common electrodes may be formed by a single patterning process, so that the production cycle of the array substrate may be effectively shortened.

Third Embodiment

Figure 8:
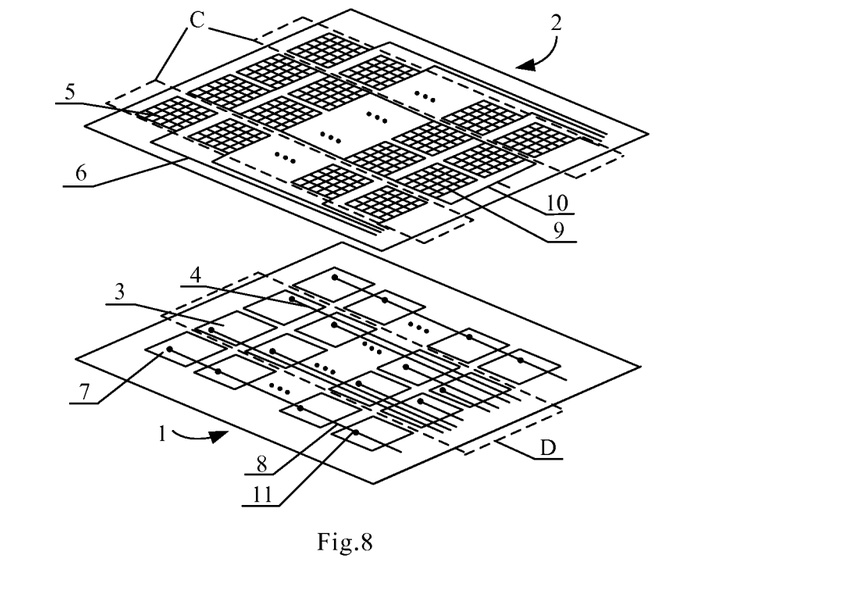
FIG. 8 is a structural diagram of a touch screen panel in a third embodiment of the present invention.
Figure 9:
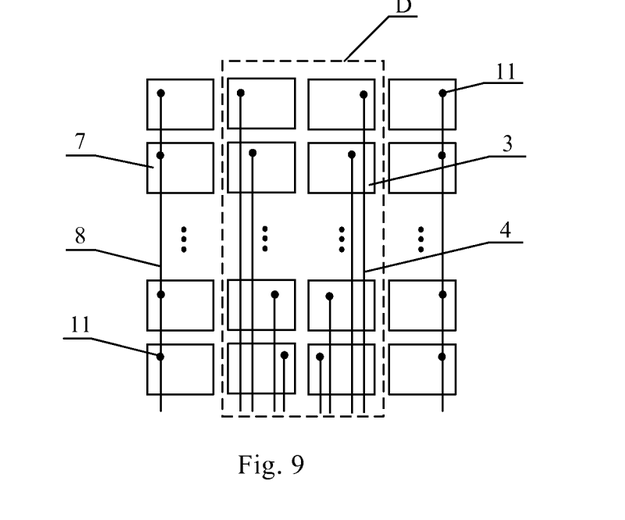
FIG. 9 is a top view of the array substrate in FIG. 8.
Figure 10:
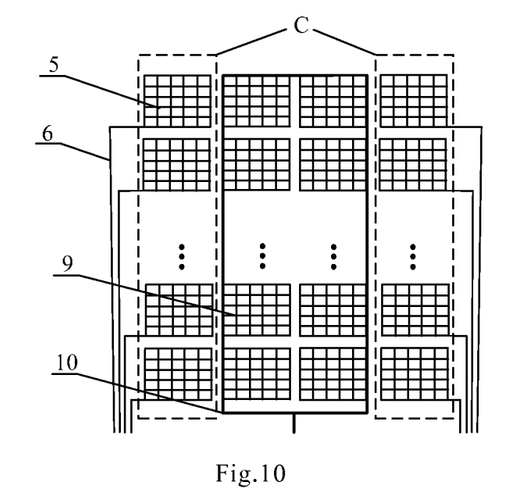
FIG. 10 is a top view of the assembling substrate in FIG. 8.

FIG. 8 is a structural diagram of a touch screen panel in a third embodiment of the present invention, FIG. 9 is a top view of the array substrate in FIG. 8, and FIG. 10 is a top view of the assembling substrate in FIG. 8. As shown in FIG. 8 to FIG. 10, this embodiment is a variation of the above second embodiment, difference between this embodiment and the above second embodiment is in that, in this embodiment, the first self capacitive electrodes 3 are located in a middle region of the array substrate 1 (including the region D), and the second self capacitive electrodes 5 are located in a surrounding region of the assembling substrate 2 (including the region C), the first leads 4 are provided in a different layer from the first self capacitive electrodes 3, each of the first self capacitive electrodes 3 is electrically connected to one corresponding first lead 4 through a via 11, and the second leads are provided in the same layer as the second self capacitive electrodes.

In this embodiment, the first self capacitive electrodes 3 are provided in a middle region of the array substrate 1, the first leads 4 are provided in a different layer from the first self capacitive electrodes 3, each of the first self capacitive electrodes 3 is electrically connected to one corresponding first lead 4 through a via 11, so that it is unnecessary for the first leads 4 to pass through the frame region of the array substrate, and thus the number of wires in the border region of the array substrate 1 is further reduced. In addition, it is unnecessary for the first leads 4 to be provided in spacer regions between the first self capacitive electrodes 3, therefore, the number of wires in the spacer regions between the first self capacitive electrodes 3 may be reduced, and occurrence of touch blind zone in the display screen can be avoided.

In addition, the common electrode 7 on the array substrate 1 and the third lead 8 may also be connected through the via 11.

In this embodiment, the second self capacitive electrodes 5 are provided in the surrounding region of the assembling substrate 2, and the second leads 6 are provided in the same layer as the second self capacitive electrodes 5, so that length of the wire of the second lead 6 for connecting the second self capacitive electrode 5 to the frame region can be shortened, and light blocking structure corresponding to the wire in the touch screen panel may be reduced accordingly, and therefore, aperture ratios of part of the pixel units in the touch screen panel may be increased.

Persons skilled in the art should be understood that, a case, in which the first self capacitive electrodes 3 are provided in a surrounding region of the array substrate 1, the second self capacitive electrodes 5 are provided in the middle region of the assembling substrate 2, the first leads 4 are provided in the same layer as the first self capacitive electrodes 3, the second leads 6 are provided in a different layer from the second self capacitive electrodes 5, and each of the second self capacitive electrodes 5 is electrically connected to a corresponding second lead 6 through a via, should be deemed as falling within the protection scope of the present invention.

The third embodiment of the present invention provides a touch screen panel, in which the technical effect recited in the above second embodiment can be realized, moreover, the number of wires in the border region of the array substrate 1 can be further reduced and occurrence of touch blind zone in the display screen can be avoided by providing the first self capacitive electrodes in a middle region of the array substrate, and providing the first leads in a different layer from the first self capacitive electrodes. In addition, in this embodiment, the second self capacitive electrodes are provided in the surrounding region of the assembling substrate, and the second leads are provided in the same layer as the second self capacitive electrodes, so that aperture ratios of part of the pixel units in the touch screen panel may be increased.

Fourth Embodiment

The fourth embodiment of the present invention provides a display device comprising the touch screen panel in the above first embodiment, the second embodiment or the third embodiment. The display device may be any product or component with display function such as a mobile phone, a tablet computer, a TV, a display, a notebook computer, a digital image frame and a navigator. Embodiments of this display device may be referred to the embodiments of the above touch screen panel, and which will not be repeated herein.

It should be noted that, the case in which each row of electrodes include four electrodes in the drawings of the respective embodiments is just exemplified, and is not used to limit the solutions of this application.

It should be understood that, the above embodiments are only exemplary embodiments used to explain the principle of the present invention and the protection scope of the present invention is not limited thereto. The person skilled in the art can make various variations and modifications without departing from the spirit and scope of the present invention, and these variations and modifications should be considered to belong to the protection scope of the invention.

The invention claimed is:

1. A touch screen panel, comprising: an array substrate, an assembling substrate arranged opposite to the array substrate, and a touch detection chip for detecting a touch, wherein the array substrate comprises: a first predetermined number of first self capacitive electrodes and first leads in one-to-one correspondence with the first self capacitive electrodes, the first leads are used for transmitting feedback signals generated by the first self capacitive electrodes to the touch detection chip;

the assembling substrate comprises: a second predetermined number of second self capacitive electrodes and second leads in one-to-one correspondence with the second self capacitive electrodes, the second leads are used for transmitting feedback signals generated by the second self capacitive electrodes to the touch detection chip; and projections of the first self capacitive electrodes on the assembling substrate fall within a region on the assembling substrate without the second self capacitive electrodes.

2. The touch screen panel of claim 1, wherein the first self capacitive electrodes are located in an upper half part of the array substrate, and the second self capacitive electrodes are located in a lower half part of the assembling substrate.

3. The touch screen panel of claim 1, wherein the first self capacitive electrodes are located in a lower half part of the array substrate, and the second self capacitive electrodes are located in an upper half part of the assembling substrate.

4. The touch screen panel of claim 1, wherein the first self capacitive electrodes are located in a middle region of the array substrate, and the second self capacitive electrodes are located in a surrounding region of the assembling substrate.

5. The touch screen panel of claim 4, wherein the first leads are provided in a different layer from the first self capacitive electrodes, each of the first self capacitive electrodes is electrically connected to one corresponding first lead through a via;

the second leads are provided in the same layer as the second self capacitive electrodes.

6. The touch screen panel of claim 1, wherein the first self capacitive electrodes are located in a surrounding region of the array substrate, and the second self capacitive electrodes are located in a middle region of the assembling substrate.

7. The touch screen panel of claim 6, wherein the second leads are provided in a different layer from the second self capacitive electrodes, each of the second self capacitive electrodes is electrically connected to one corresponding second lead through a via;

the first leads are provided in the same layer as the first self capacitive electrodes.

8. The touch screen panel of claim 1, wherein the first predetermined number is equal to the second predetermined number.

9. The touch screen panel of claim 1, wherein the array substrate further comprises several common electrodes and a common voltage drive unit, the common electrodes are provided in the same layer as the first self capacitive electrodes, all the common electrodes are connected to the common voltage drive unit through one third lead, and all the first leads are further connected to the common voltage drive unit;

the common voltage drive unit is used to output a common voltage signal to the first self capacitive electrodes and the common electrodes during a display period, and output the common voltage signal to the common electrodes during a touch period.

10. The touch screen panel of claim 9, wherein the first self capacitive electrode is plate-shaped.

11. The touch screen panel of claim 1, wherein the second self capacitive electrode is a mesh-shaped electrode, meshes of which correspond to display regions of pixel units in the touch screen panel.

12. The touch screen panel of claim 1, wherein the assembling substrate further comprises: dummy electrodes provided in the same layer as the second self capacitive electrodes, all the dummy electrodes are connected together through a fourth lead, and the fourth lead is used to allow the dummy electrodes to be in a float state.

13. A display device comprising the touch screen panel of claim 1.

* * * * *